Nov. 16, 1965  F. HOLLMANN  3,218,423
HIGH-VOLTAGE MULTIPHASE CIRCUIT BREAKER
WITH ARC QUENCHING CHAMBERS
Filed April 29, 1964  3 Sheets-Sheet 3

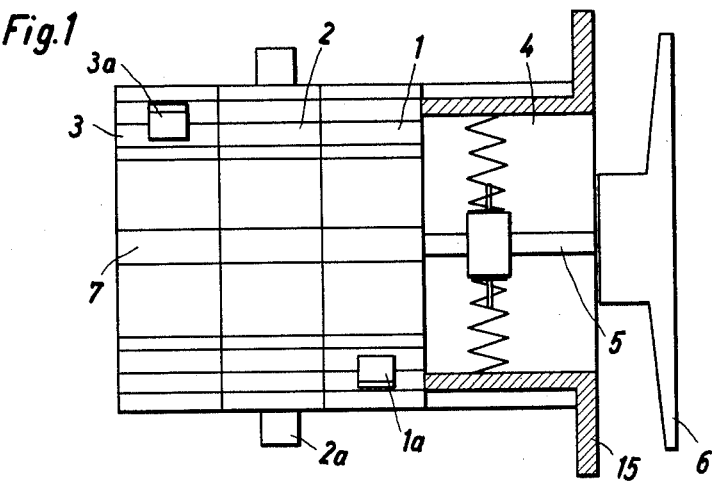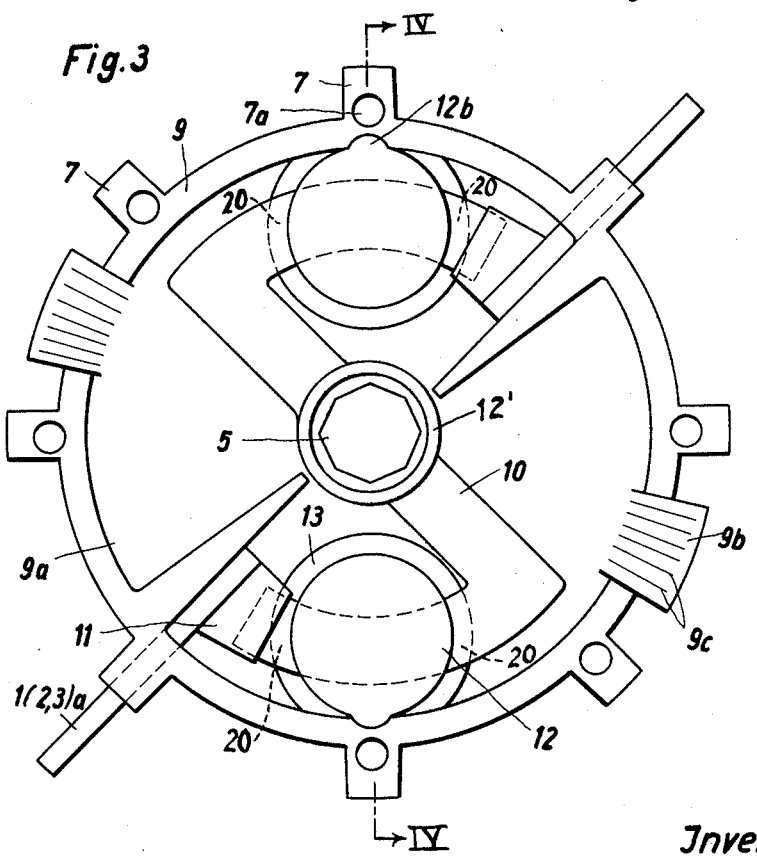

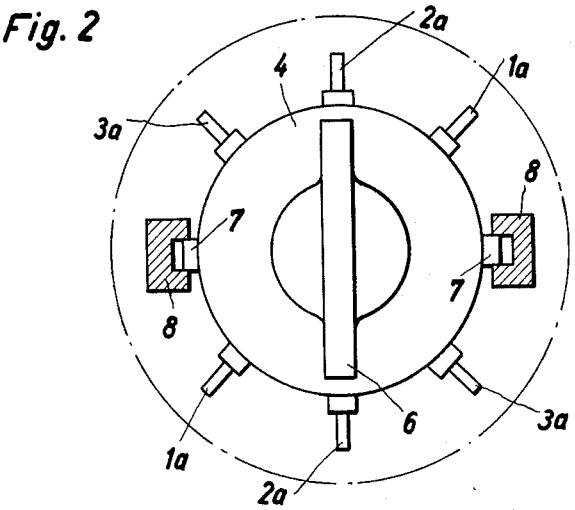
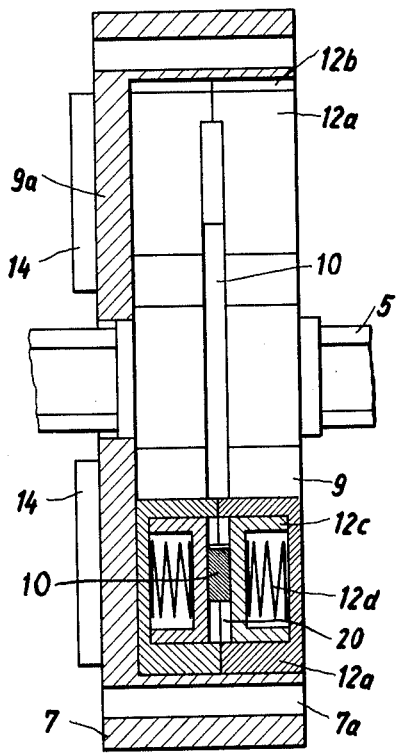

Inventor:

United States Patent Office 3,218,423
Patented Nov. 16, 1965

3,218,423
HIGH-VOLTAGE MULTIPHASE CIRCUIT BREAKER WITH ARC QUENCHING CHAMBERS
Fritz Hollmann, Rheydt, Rhineland, Germany, assignor to Fritz Driescher Spezialfabrik für Elektrizitätswerksbedarf, Rheydt, Rhineland, Germany, a corporation of Germany
Filed Apr. 29, 1964, Ser. No. 363,521
Claims priority, application Germany, Sept. 14, 1963, D 42,479
10 Claims. (Cl. 200—149)

My invention relates to switches for high-voltage multiphase power distribution or feeder systems, and more particularly to three-phase switch assemblies wherein the three circuit breakers required for the respective feeders coming from a three-phase bus bar group, are combined with the drives for their moving contacts so that the three-phase switch assembly can be pulled out of its housing compartment containing the fixed terminals for attachment of the incoming feeders and the outgoing load or service leads.

The known circuit-breaker systems and their enclosures form bulky and heavy devices which can be pulled manually out of the compartment only by transferring them to a truck or carriage on which they can be physically separated from the compartment sufficiently for freely exposing the disconnected testing points.

It is an object of the invention to provide such a system that is compact and light enough in weight to be withdrawn easily from the switch assembly housing compartment by a single attendant.

To this end and in accordance with the invention, I provide an assembly which comprises a housing that has a number of terminals for connection to outgoing feeders of bus bars and to service mains, and a switch unit that includes a number of switches and a quick-break snap-action control mechanism, each of the switches being contained in an individual flat cylindrical casing, the casings being all coaxially aligned and mechanically joined with each other. A casing is also provided for the snap-action control mechanism which has a manually operable member at one end of the coaxially aligned casings connected to a shaft extending axially through the casings. Each of the switch units has a movable contact securely coupled with the shaft and rotatable thereby through an angle of about 90°. The movable contact has a blade portion extending diametrically and substantially symmetrically through the casing of the switch unit and has two diametrically opposite end portions protruding arcuately from the blade portion in the same rotational sense near the inner periphery of the casing, respectively engageable with two fixed contacts mounted in the casing of each switch unit at diametrically opposite locations and mutually insulated. Two arc quenching chamber structures are provided adjacent to the respective fixed contacts in the housing, the two end portions of all of the movable contacts being simultaneously movable through the respective chamber structures into and out of contact engagement with the respective fixed contacts. Also provided are external knife contacts extending from the respective fixed contacts and radially protruding from each of the switch casings, a switch housing having a compartment for the set of switch units and having insulating guide means for axial insertion and withdrawal of the set, and coupling contacts for connection to feeder and load lines. The coupling contacts are mounted in the compartment and are conductively engageable by the respective knife contacts when the set is inserted. Each set can consequently be manually pulled from the compartment for exposing the disconnect points at the knife contacts and coupling contacts.

In operation, each switch controls one phase of the voltage.

The insulated radial blades are rotatable about the casing axis and have two ends that are engageable respectively with a fixed contact, and when not engaging the contacts afford two test points that are in series for each phase. Thus, the individual test points and the distance traversed during the switching movements of the blades, as well as the length of the blades themselves, are relatively short when compared with test points which require blades that pivot only in one direction or switching pins that are displaceable only rectilinearly. The switching distances are short and the blades are correspondingly of short length because each fixed contact is provided with an arc quenching chamber that is closed after the withdrawal of the blade ends and which prevents arcing. The symmetrical rotary blades are receivable with other components of the switches in relatively flat casings of circular cross section which require relatively little space. Consequently, the coaxially aligned adjacent flat casings accommodate circuit breakers of relatively reduced dimension in all directions so that the housing of the entire switch assembly in which the individual circuit breakers are received is also correspondingly small.

Other features which are considered as characteristic of the invention are set forth in the appended claims.

Although the invention has been illustrated and described as embodied in a high-voltage multiphase circuit breaker, it is nevertheless not intended to be limited to the details shown, since various modifications and structural changes may be made therein without departing from the spirit of the invention and within the scope and range of equivalents of the claims.

The construction and method of operation of the invention, together with additional objects and advantages thereof will be best understood from the following description of specific embodiments when read in connection with the accompanying drawings, in which:

FIG. 1 is a diagrammatic side elevation of the three-phase circuit breaker comprising a set of three switch units;

FIG. 2 is a front elevation of the circuit breaker shown in FIG. 1;

FIG. 3 is an enlarged plan view of one of the individual switch units of which the breaker is composed;

FIG. 4 is an axial cross section taken along the line IV—IV of FIG. 3;

Figure 5:
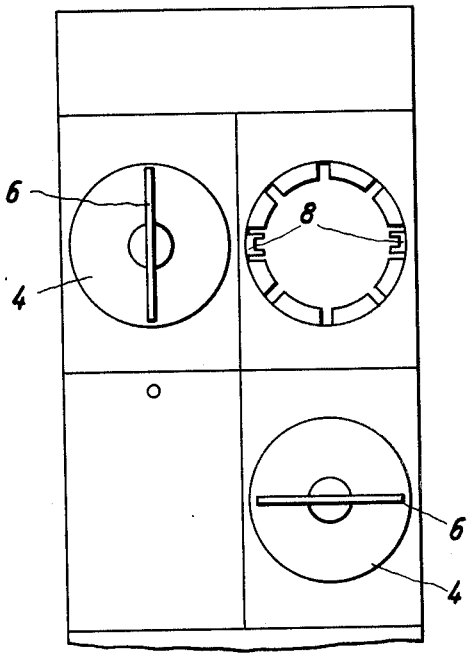
FIG. 5 is a front elevation of a distributor with three 3-phase compartments of which two are shown to contain inserted three-phase circuit breakers according to FIGS. 1 to 4.
Figure 6:
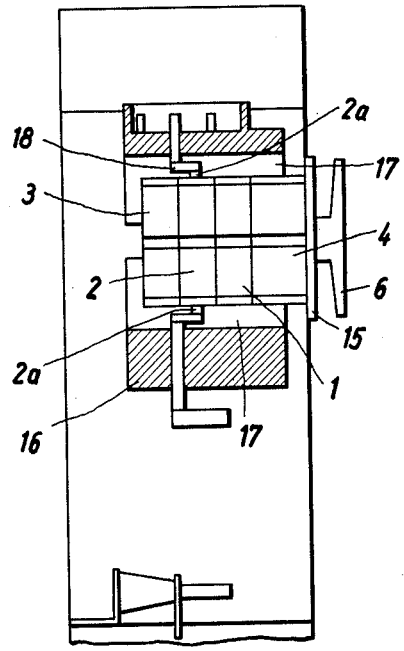
FIG. 6 is a vertical section through the left-hand half of the distributor illustrated in FIG. 5 with one circuit breaker in position.

Referring now to the drawings and particularly to FIG. 1, there is shown a circuit breaker set which comprises three coaxially aligned adjacent individual switches 1, 2, 3 that are received in flat cylindrical cup-shaped casings 9 which are suitably connected, by means hereinafter described, to one another and to a similarly shaped casing 4 of a quick-break cutout or snap-action mechanism. A switch control shaft 5 having a polygonal cross section is mounted in the casing 4 and carries a manually operable handle or knob 6, which has an under cut shape to permit the push-pull insertion or withdrawal of the set, outside the end face of the casing 4. The shaft extends through the casings 9 and central openings formed in the bottom 9a thereof and through respective hubs 12′ of the rotatable contact 10 of switches 1, 2, 3, the contact 10 being centrally mounted within the respective casings 9. Two diametrically opposed switch blades 1a, 2a and 3a project radially outwardly from each respective casing 9 for connecting each of the switches 1, 2 and 3 respectively to feeders coming from bus bars and to respective service mains. The individual switches 1, 2, 3 are identical to one another and are distributed in such a manner in the circuit breaker about the shaft 5 so that, as shown in FIG. 2, the blades of the individual switches are displaced 45° from one another. In addition, the casing 9 of each switch 1, 2, 3 has three pairs of ribs 7 disposed diametrically opposite one another on the outer periphery of the casing 9 and extending parallel to the axis of the casing. The ribs are staggered around the shaft 5 offset 45° relative to one another and relative to externally projecting knife contacts 1a, 2a, 3a so that, at the junction between each adjacent pair of switch casings 9, the ribs 7 are in alignment and form continuous guides disposed opposite one another in the switch system or circuit breaker and serve to guide it in matching grooves 8 in a switch assembly housing 16 (FIG. 6). The knife contacts of each of the switch units are offset 45° from respective knife contacts of the adjacent switch unit.

Each of the casings 9 are identical with each other and respectively contain the identical switches 1, 2 and 3. A switch blade 10 is mounted centrally in each casing 9 respectively with the hubs 12' thereof adjacent the base 9a of each casing 9 respectively for turning around the axis of rotation, the ends of the blades 10 extending in the same rotary direction around the periphery of the casing and being introducible into fixed contacts 11 mounted within the casing. The hub 12' of the blades 10 are each formed with a central polygonal aperture through which the polygonal portion of switch shaft 5 extends and the shaft 5 can be keyed or secured by any other suitable means to the hub of the blades 10 for rotation therewith in either rotary direction. An arc-quenching chamber 12 is located in front of each fixed contact 11. As shown in greater detail in FIG. 4, each chamber 12 is surrounded by a two-piece casing 12a which is releasably secured in the switch casing 9 by a projection or tongue of irregular cross section 12b thereof which is received in a matching groove in the wall of the casing 9, or secured by any other suitable means such as screws or the like. Each of the casings 12a comprises a pair of circular flat and coaxially aligned insulating members 12c of plastic material which evolve gas when heated by arcing of the contacts. The plastic casing members 12c are pressed against one another by springs 12d bearing at one end against the adjacent sides of the casing members 12c and at the other end against a part of the chamber casing 12a and, when the blade 10 is fully withdrawn from the fixed contacts 11 through the spark-quenching chamber 12, the plastic casing members 12c are biased by the springs 12d into engagement with each other so as to close the apertures 20 in the chamber casing 12a through which the blade 10 extends when engaging the fixed contact 11. The fixed contact 11 and arc-quenching chambers 12 in each casing 9 are separated from one another and from the hollow interiors of the casing 9 by walls 13 as shown in FIG. 3.

The coaxially adjacent casings 9 of the switches 1, 2 and 3 are secured against rotation by projections 14 external to the bases 9a of the casings 9, the projections 14 abutting against the respective partitions 13 of the particular casing 9 located adjacent thereto and to the left thereof as seen in FIG. 1. A mechanical connection between the individual casings 9 and between the casings 9 and the casing 4 which contains the quick-break or snap-action mechanism is effected by pins or bolts that are introduced through the aligned bores 7a in the ribs 7 of the casings 9. The casing 4 has an annular flange 15, as seen in FIG. 1, and which is represented diagrammatically by the dot-and-dash circle in FIG. 2 which permits the circuit breaker to be secured by screws or similar fasteners to the front panel of a distributor mounting or frame, in a manner shown in FIG. 6. The flange 15 also provides an outer covering for an annular gap 17 located between the periphery of the casings 9 and the inner wall of a housing 16. The gap 17 affords ventilation of the casings 9 whose peripheral wall is additionally formed with ventilating apertures 9b (FIG. 3) that communicate with the gap 17 and are adapted to receive a number of cooling plates 9c which are suitably supported in a known manner.

The housings 16 are provided, for each of the three stages that are disposed one next to another, with two diametrically opposite contact pairs 18 which are interlockably engageable by a pair of the knife contacts 1a, 2a, 3a which prevents the stages or set of switches from being pulled out of the housing compartment when the movable contacts engage the fixed contacts. The three contacts 18 on any one side of the circuit breaker are connected to one outgoing feeder each from a bus bar group, while the three contacts 18 on the opposite side of the housing are connected one each to an outgoing power main.

The casings 9 and the housing 16 are preferably made of casting resin such as an epoxy resin or similar material. Such materials enable complicated moldings to be manufactured economically and, due to their strength after curing permits the manufacture of thin-walled casings, and also permits metal parts, which experience severe mechanical stressing, to be embedded securely in the resin.

I claim:
1. A high-voltage multiphase circuit breaker, comprising a set of as many switch units as the system has phases, a manually operable switch mechanism common to said switch units, said units and said mechanism having respective flat cylindrical casings coaxially aligned and mechanically joined with each other, said set having a switch control shaft extending axially through said casings and connected with said mechanism, each of said switch units having a movable contact coupled with said shaft and rotatable thereby through an angle of about 90°, said movable contact having a blade portion extending diametrically and substantially symmetrically through said casing of the switch unit and having two diametrically opposite end portions protruding arcuately from said blade portion in the same rotational sense near the inner periphery of said casing, two fixed contacts mounted and mutually insulated in said casing of each switch unit at diametrically opposite locations, two arc quenching chamber structures adjacent to said respective fixed contacts in said housing, said two end portions of all of said movable contacts being simultaneously movable through said respective chamber structures into and out of contact engagement with said respective fixed contacts, external knife contacts extending from said respective fixed contacts and radially protruding from each of said switch casings; a switch housing having a compartment for said set of switch units, said compartment having insulating guide means for axial insertion and withdrawal of said set, and coupling contacts for connection to feeder and load lines, said coupling contacts being mounted in said compartment and conductively engageable by said respective knife contacts when said set is inserted, whereby each set can be manually pulled from said compartment for exposing the disconnect points at said knife contacts and coupling contacts.

2. In a circuit breaker according to claim 1, said casing being cup-shaped and having a cup bottom with a central opening traversed by said shaft, said shaft having polygonal cross section, and each of said movable contacts having a hub portion with a polygonal opening seated on said shaft so as to be non-rotatable relative thereto, said hub portion being adjacent to said cup bottom.

3. In a circuit breaker according to claim 1, said knife contacts of each of said switch units being offset from those of each adjacent switch unit a fixed angular amount in the same direction about the casing axis.

4. In a circuit breaker according to claim 1, said knife contacts of each of said switch units being offset 45° from the respective knife contacts of each adjacent switch unit.

5. In a circuit breaker according to claim 1, each of said arc-quenching chambers comprising two flat and coaxial insulating members of plastic material to evolve gas when heated, each of said members forming a cup having its opening face that of the other member, and springs in the respective cups for pressing said members toward each other.

6. In a circuit breaker according to claim 1, each of said switch casings having internal portioning wall portions individually enclosing said arc-quenching chambers and separating them from each other and from the remainder of the casing interior.

7. In a circuit breaker according to claim 1, each of said switch casings having on their outer periphery six protruding ribs parallel to the casing axis and offset 45° from each other and from said knife contacts, said ribs having respective bores to be traversed by coupling bolts for securing said casings together.

8. In a circuit breaker according to claim 1, said housing compartment and said mechanism casing having respective interlock means interengageable when said switch units have said movable contacts in engagement with said fixed contacts to then prevent said set from being pulled out of said compartment.

9. In a circuit breaker according to claim 1, said switch mechanism comprising a knob mounted on said shaft outside of said mechanism casing for manual rotational operation of said circuit-breaker set, and said knob having an undercut shape and thereby forming a pull-and-push handle for insertion and withdrawal of said set.

10. In a circuit breaker according to claim 1, said casings being radially spaced from the inner surface of said housing compartment so as to form an annular interspace, said switch casings having venting openings communicating with said interspace, and said mechanism casing having a flange covering said interspace at the compartment front when said set is inserted in said compartment.

References Cited by the Examiner
UNITED STATES PATENTS
2,709,734   5/1955   Coliz _____ 200—144

KATHLEEN H. CLAFFY, *Primary Examiner.*